United States Patent [19]
Fox

[11] Patent Number: 5,878,827
[45] Date of Patent: Mar. 9, 1999

[54] MOTORIZED WHEELBARROW

[75] Inventor: Rick Dean Fox, Santa Cruz, Calif.

[73] Assignee: Power Technology Unlimited, Inc., Fresno, Calif.

[21] Appl. No.: 31,357

[22] Filed: Feb. 26, 1998

[51] Int. Cl.$^6$ .................................................. B62D 51/04
[52] U.S. Cl. ...................... 180/19.1; 280/653; 280/47.31
[58] Field of Search ................... 180/19.1, 19.2, 180/19.3, 13; 280/653, 47.31; 298/2, 3

[56] References Cited

U.S. PATENT DOCUMENTS

| | | | |
|---|---|---|---|
| 2,918,133 | 12/1959 | Ericsson | 183/19.1 |
| 3,791,470 | 2/1974 | Baddore et al. | 183/19.1 |
| 4,811,988 | 3/1989 | Immel | 298/2 |
| 5,489,000 | 2/1996 | Hillbohm | 180/19.1 |
| 5,690,191 | 11/1997 | Burbank | 280/47.31 X |

FOREIGN PATENT DOCUMENTS 1335577  7/1963  France ................................. 180/19.1

*Primary Examiner*—Christopher P. Ellis
*Attorney, Agent, or Firm*—Jeffrey A. Hall

[57] ABSTRACT

A motorized wheelbarrow comprising a frame having a pair of handles with each handle having a proximal and a distal end and a pair of downwardly depending support elements. A first wheel is secured to the distal ends of the pair of handles by a frame element and a rear set of wheels is secured to the proximal ends of the pair of handles by a frame element. A mounting element is secured to the frame for supporting a drive engine. A drive mechanism including a chain and a sprocket is operably linked to a toothed wheel and to the drive engine. The toothed wheel includes an internal brake drum and internal brake shoes. A centrifugal clutch for engagement with the drive mechanism is operably engaged to a throttle mechanism and to the drive engine, and a load bucket is mounted to the frame.

14 Claims, 2 Drawing Sheets

MOTORIZED WHEELBARROW

BACKGROUND OF THE INVENTION

1. Field of Invention

This invention relates wheelbarrows, and more particularly to wheelbarrows which are equipped with an engine and drive means for propelling the wheelbarrow.

2. Description of the Related Art

The usefulness of wheelbarrows is well known to those involved in construction, gardening, and other uses where loads are moved and transported form one place to another. The wheelbarrow is a unique tool in that due to its single wheel design, a relatively heavy load may be balanced and moved. Wheelbarrows are also useful in that they may be used to move loads over rough and difficult terrain where other means of transport would be very difficult.

Heretofore, attempts have been made to power or motorize wheelbarrows by using gasoline powered engines in order to propel the wheelbarrow and load carried in the wheelbarrow. For example, U.S. Pat. No. 2,533,549 issued to Bell uses an air cooled gasoline motor and power transmission mechanism affixed to the wheelbarrow. U.S. Pat. No. 4,589,508 issued to Hoover et al. discloses a motorized wheelbarrow utilizing a gasoline engine which drives a front wheel through a friction drive transmission. The speed of the wheelbarrow is controlled by a throttle lever which is mounted on a handle of the wheelbarrow and is in combination with the friction drive lever which allows for the engine to be slowly and gradually engaged. U.S. Pat. No. 5,211,254 issued to Harris, III et al. discloses a motorized wheelbarrow using a displacement type engine and multispeed transmission to drive the wheel of the wheelbarrow.

Such motorized wheelbarrows all suffer from significant disadvantages and limitations, which undoubtedly have been a reason they have not been widely accepted. For example, such wheelbarrows are bulky, cumbersome, and difficult and dangerous to use in many types of terrain. Further, such wheelbarrows are excessively heavy and unbalanced requiring the user to shift and manipulate the load to compensate therefore which detracts from the power gained from the motor.

Accordingly, it is the primary object of this invention to provide a motorized wheelbarrow which is lightweight, strong, balanced, and efficient at carrying and transporting a wide range of load sizes and weights. The motorized wheelbarrow of the present invention has high performance capability and possesses sufficient power to drive the wheelbarrow at both slow speeds or at high speeds with small, medium or large loads.

Additional objects and advantages of the invention will be set forth in the description which follows, and in part will be obvious from the description, or may be learned by practice of the invention. The objects and advantages of the invention may be realized and obtained by means of the instrumentality's and combinations particularly pointed out in the appended claims.

SUMMARY OF THE INVENTION

To achieve the foregoing objects, and in accordance with the purpose of the invention as embodied and broadly described herein, a motorized wheelbarrow is provided comprising a frame having a pair of handles with each handle having a proximal and a distal end and a pair of downwardly depending support elements. A first wheel secured to the distal ends of the pair of handles and a rear set of wheels is secured to the proximal ends of the pair of handles. A mounting element is secured to the frame for supporting a drive engine. A drive mechanism including a chain and a sprocket is operably linked to a toothed wheel and to the drive engine. The toothed wheel includes an internal brake drum and internal brake shoes. A centrifugal clutch for engagement with the drive mechanism is operably engaged to a throttle mechanism and to the drive engine. A load bucket is mounted to the frame.

The motorized wheelbarrow of the present invention is lightweight, balanced, efficient, and highly effective at allowing a user to transport loads of all sizes with great maneuverability and control. The motorized wheelbarrow of the present invention allows a user to transport loads which ordinarily could not be easily or efficiently transported by a conventional wheelbarrow, thereby providing both a highly efficient and safe transport means.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

DESCRIPTION OF THE PREFERRED EMBODIMENTS

Reference will now be made in detail to the present preferred embodiments of the invention as illustrated in the accompanying drawings.

In accordance with the present invention, there is provided in a preferred embodiment of the invention, a motorized wheelbarrow comprising a frame having a pair of handles with each handle having a proximal and a distal end and a pair of downwardly depending support elements. A first wheel is secured to the distal ends of the pair of handles by frame elements and a rear set of wheels is secured to the proximal ends of the pair of handles by a frame element. A mounting element is secured to the frame for supporting a drive engine. A drive mechanism including a chain and a sprocket is operably linked to a toothed wheel and to the drive engine. The toothed wheel includes an internal brake drum and internal brake shoes. A centrifugal clutch for engagement with the drive mechanism is operably engaged to a throttle mechanism to the drive engine. A load bucket is mounted to the frame for transporting and carrying objects or particulates.

In accordance with the present invention, there is also provided an improved motorized wheelbarrow of the type in which a frame is secured to a pair of handles each handle having a proximal and a distal end thereto and a pair of downwardly depending support elements. A first is wheel secured to the distal ends of the pair of handles by frame elements and a drive engine is mounted on the frame. A load bucket is secured to the frame. The improvement comprises a rear set of wheels secured to the proximal ends of the pair of handles by a frame element, a mounting element secured to the frame for supporting the drive engine, a drive mechanism including a chain and a sprocket operably linked to a toothed wheel and to the drive engine. The toothed wheel has an internal brake drum and internal brake shoes. A centrifugal clutch is provided for engagement with the drive mechanism and a throttle mechanism is operably engaged to the centrifugal clutch and to the drive engine.

Figure 1:
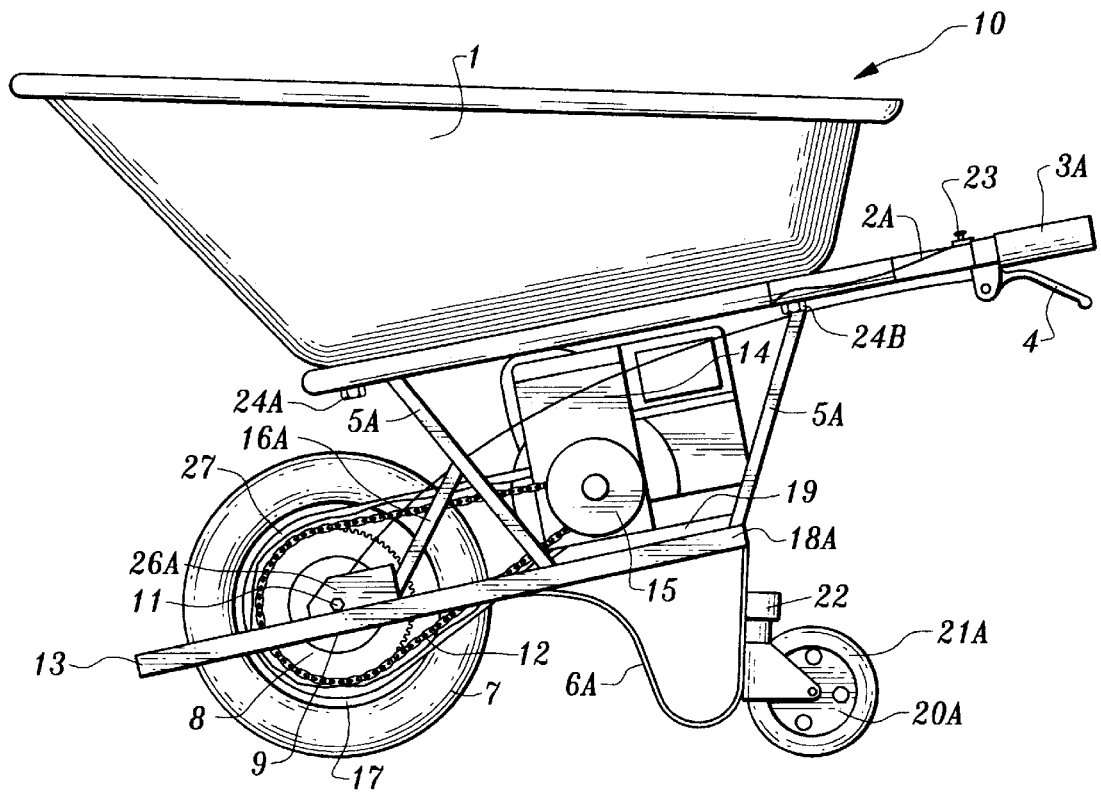
FIG. 1 is a left side elevational view of a motorized wheelbarrow, according to the invention.

In FIG. 1, the motorized wheelbarrow, is shown according to a preferred embodiment of the invention with frame elements 18A and 18B preferably with end caps 13, and is secured to upright frame elements 5A, 5B, 5C and 5D by welding or mechanical fastening means such as bolts screws, nuts, and the like. Frame braces 16A and 16B downwardly depend and may be used for additional support and stability. The frame is secured to a pair of handles 2A and 2B each having a proximal and a distal end thereto and which are preferably provided with handle grips 3A and 3B. A pair of metal skids 6A and 6B may be provided and are preferably secured to frame tubing 18A and 18B.

Figure 2:
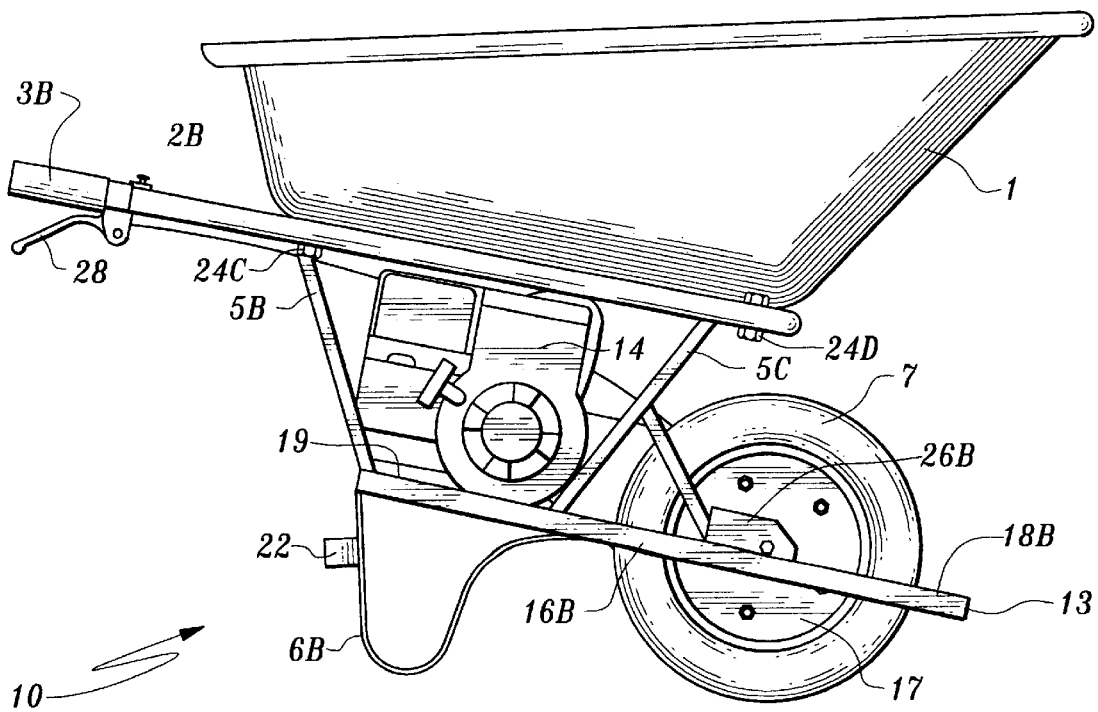
FIG. 2 is a right side elevational motorized wheelbarrow according to the invention.

As seen in FIGS. 1 and 2, a load bucket 1, which is preferably composed of polyurethane or other durable and resilient material is secured to handles 2A and 2B. Bucket 1 may be a load bucket as shown, or in alternative embodiments be a flat bed type load bucket or carrier or otherwise configured as desired. Fastening means such as bolts, nuts and washers 24A and 24B are used to secure bucket 1 to the frame.

Figure 3:
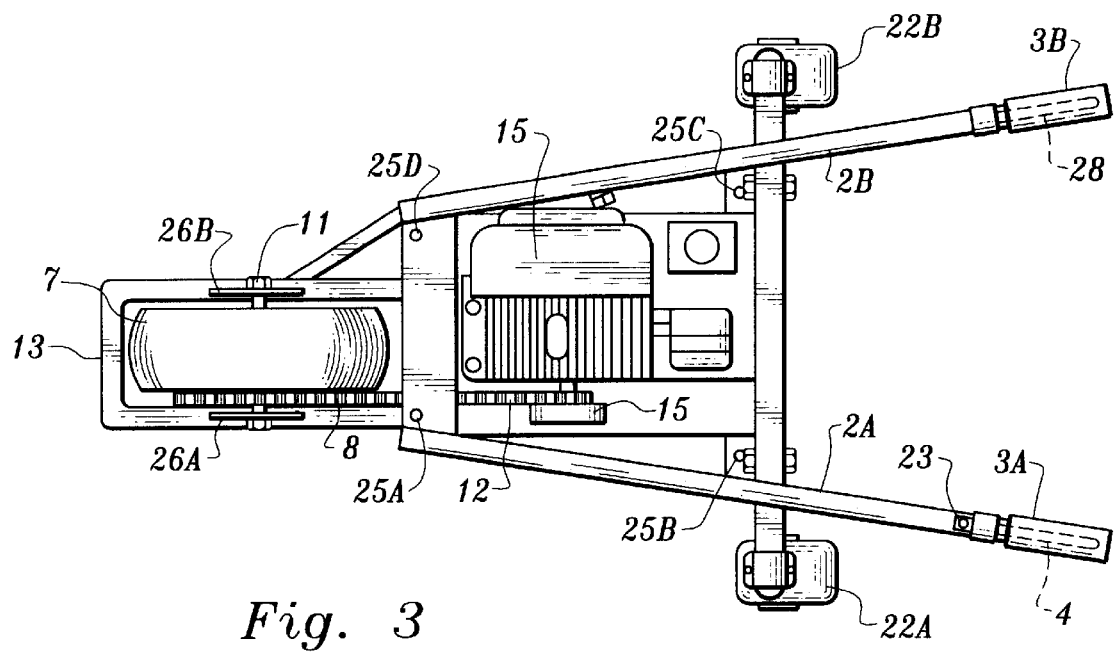
FIG. 3 is a top view of such motorized wheelbarrow with the load bucket detached, according to the invention.

In FIGS. 1, 2 and 3, a first wheel 7 is secured to the distal ends of handles 2A and 2B by frame tubing 18A and 18B and upright support 5B and 5C. Wheel 7 preferably has a 16 inch by 4 inch three ply tire, however, other sizes may be substituted as desired. Wheel 7 may be provided with extension bearing hubs 17 as shown. Wheel 7 is operably linked by an axle housed in axle housing 26A and 26B to sprocket wheel. Sprocket wheel 8 is preferably a 72 tooth sprocket, but may be otherwise, having an internal brace drum and internal brake shoes 9 operably linked to a brake cable and brake lever 4. Axle housing 26A and 26B are secured to the axle by an axle bolt 11, preferably a hex head axle bolt with nylon locknut.

Best seen in FIG. 1, a drive mechanism, preferably comprising chain 12 is operably linked to sprocket wheel 8 and to engine 14, which is preferably a 3.5 horsepower gas motor with recoil start means, and is preferably mounted on base plate 19 secured to frame tubing 18A and 18B. A centrifugal clutch 15 is operably linked to chain 12. Chain 12 may be protected with chain guard 27 as shown. In the preferred embodiment, engine 14 drives chain 12 and wheel sprocket 8 being propelled by centrifugal clutch 15 which is attached to the drive shaft of engine 14. When the user turns on toggle or "kill" switch 23 and the engine is started, preferably with a pull start type mechanism, he holds onto handles 2A and 2B having, in the preferred embodiment, a brake lever 4 on the left handle and a throttle lever and toggle switch 23 on the right handle. The throttle lever 28 is then pressed which engages centrifugal clutch 15 which engages the chain driven wheel sprocket 8 operably secured to wheel 7.

Best seen in FIGS. 1 and 3, a rear set of wheels 20A and 20B are preferably 6 inch castor wheels with ball bearings and a swivel flange and are preferably provided with tires 21A and 21B, however, in alternative embodiments different sizes and type wheels and tires may be provided as desired. Wheels 20A and 20B are detachable from the frame and are preferably mounted to removable tubing frame 22 comprising tubing frame elements, pins and snap rings. In FIG. 3, 25A, 25B, 25C and 25D are apertures for securing fastening means such as angle iron mountings, bolts, or the like for securing load bucket 1 to the frame.

Figure 4:
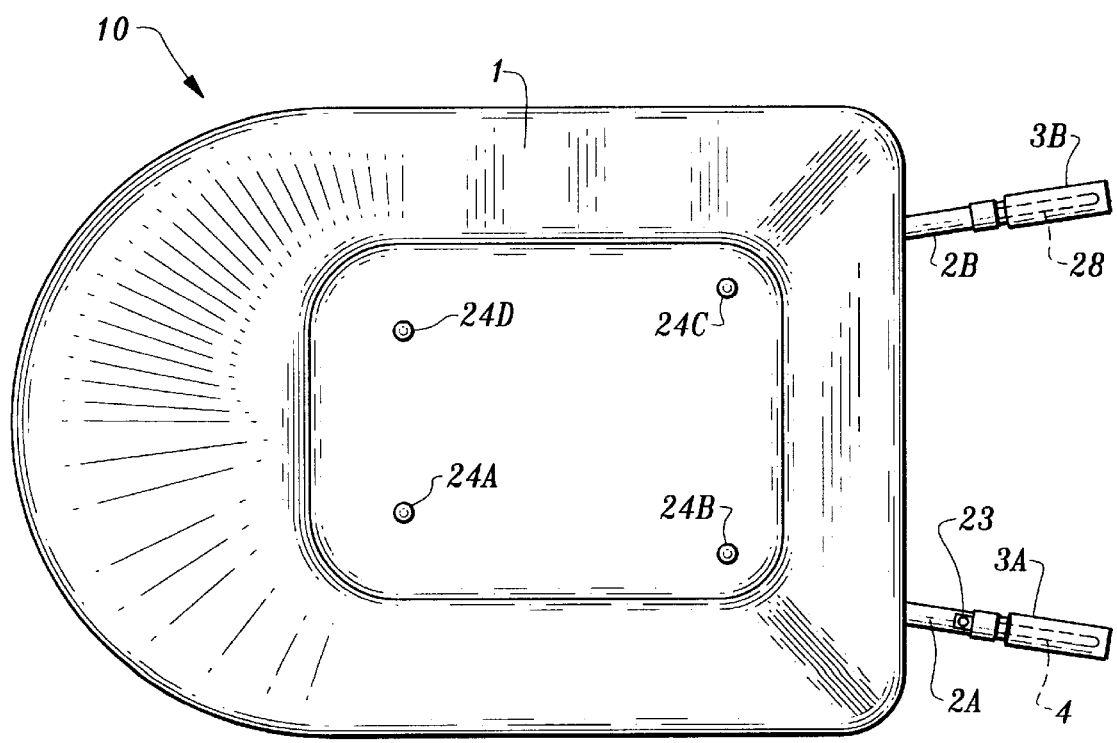
FIG. 4 is a top view of the load bucket of such motorized wheelbarrow, according to the invention.

Referring now to FIG. 4, load bucket 1 is shown and is preferably composed of polyurethane but may be otherwise composed. Load bucket 1 may be configured as shown or may be provided as a flat bed type carrier, or other shapes and sizes depending upon the application.

In operation and use motorized wheelbarrow 10 is very convenient, easy, reliable, and effective to use for all load sizes, particularly large and bulky loads. In use, a user loads loading bucket 1 with the load to be transported and then turns on toggle or "kill" switch 23 and the engine is started. The throttle lever is then pressed which engages centrifugal clutch 15 which engages the chain driven wheel sprocket 8 operably secured to wheel 7. This drives motorized wheelbarrow 10 and when the user has reached the desired destination he releases the throttle lever which disengages the centrifugal clutch and applies pressure to the brake lever to stop motorized wheelbarrow 10. If desired, the user can then lift both handles until the frame touches the surface on which the load is to be deposited, and the load can be dumped or unloaded.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. A motorized wheelbarrow, comprising:
    a frame;
    a pair of handles secured to said frame each handle having a proximal and a distal end thereto and a pair of downwardly depending support elements;
    a first wheel secured to the distal ends of the pair of handles by frame elements;
    a rear set of wheels secured to the proximal ends of the pair of handles by frame elements;
    a mounting element secured to said frame for supporting a drive engine;
    a drive mechanism including a chain and a sprocket operably linked to a toothed wheel and to said drive engine, said toothed wheel having an internal brake drum and internal brake shoes;
    a centrifugal clutch for engagement with said drive mechanism;
    a throttle mechanism being operably engaged to said centrifugal clutch and to said drive engine; and
    a load bucket secured to said frame.

2. The motorized wheelbarrow of claim 1, wherein said drive engine is a gasoline powered engine.

3. The motorized wheelbarrow of claim 1, wherein said internal brake drum is operably linked to a brake lever mounted on one of said pair of handles.

4. The motorized wheelbarrow of claim 1, further including a pair of metal skids secured to said frame.

5. The motorized wheelbarrow of claim 1, wherein said rear set of wheels are detachably mounted to said frame.

6. The motorized wheelbarrow of claim 1, wherein said load bucket is composed of polyurethane.

7. The motorized wheelbarrow of claim 1, wherein said load bucket is a flat bed configured load bucket.

8. An improved motorized wheelbarrow of the type in which a frame is secured to a pair of handles each handle having a proximal and a distal end thereto and a pair of downwardly depending support elements, a first wheel is secured to the distal ends of the pair of handles by frame elements, a drive engine is mounted on the frame, and a load bucket is secured to the frame, wherein the improvement comprises:

- a rear set of wheels secured to the proximal ends of the pair of handles by a frame element;
- a mounting element secured to said frame for supporting said drive engine;
- a drive mechanism including a chain and a sprocket operably linked to a toothed wheel and to said drive engine, said toothed wheel having an internal brake drum and internal brake shoes;
- a centrifugal clutch for engagement with said drive mechanism; and
- a throttle mechanism being operably engaged to said centrifugal clutch and to said drive engine.

9. The motorized wheelbarrow of claim 8, wherein said drive engine is a gasoline powered engine.

10. The motorized wheelbarrow of claim 8, wherein said internal brake drum is operably linked to a brake lever mounted on one of said pair of handles.

11. The motorized wheelbarrow of claim 8, further including a pair of metal skids secured to said frame.

12. The motorized wheelbarrow of claim 8, wherein said rear set of wheels are detachably mounted to said frame.

13. The motorized wheelbarrow of claim 8, wherein said load bucket is composed of polyurethane.

14. The motorized wheelbarrow of claim 13, wherein said load bucket is a flat bed configured load bucket.

* * * * *